E. MORELL.
SHEET COUNTER.
APPLICATION FILED DEC. 11, 1919.
1,384,710.
Patented July 12, 1921.
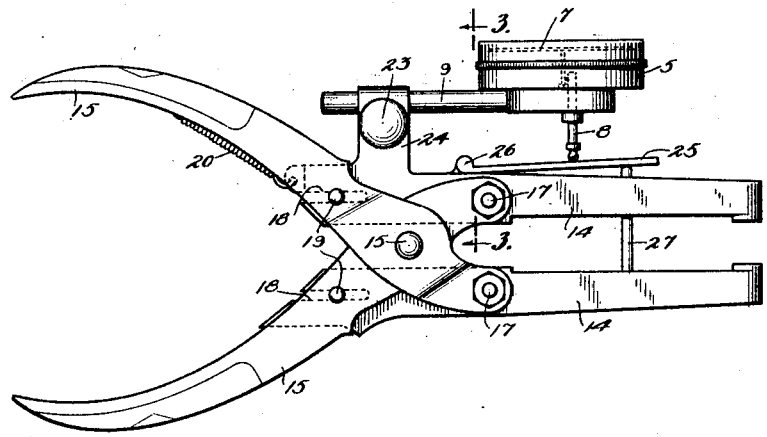
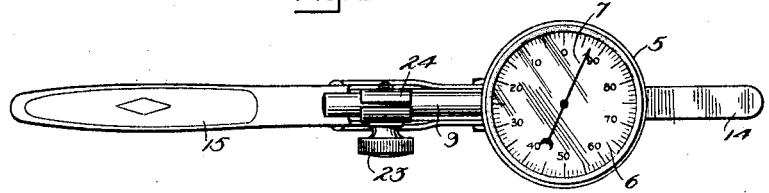
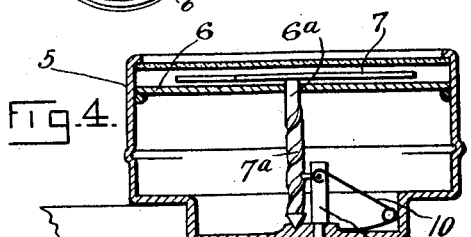
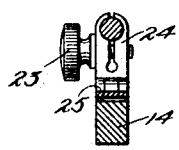
WITNESSES
INVENTOR
ELGIN MORELL.
BY
ATTORNEYS

UNITED STATES PATENT OFFICE.

ELGIN MORELL, OF NEW YORK, N. Y.

SHEET-COUNTER.

1,384,710. Specification of Letters Patent. Patented July 12, 1921.

Application filed December 11, 1919. Serial No. 343,990.

*To all whom it may concern:*

Be it known that I, ELGIN MORELL, a citizen of the United States, and a resident of the city of New York, borough of Manhattan, in the county and State of New York, have invented a new and Improved Sheet-Counter, of which the following is a full, clear, and exact description.

This invention relates to gages, counters and calipers, and more particularly to sheet counters. The invention more specifically appertains to ticket or coupon counters for computing the number of coupons, tickets or sheets of paper contained within a single stack or bundle.

It is a primary object of my invention to provide a counting caliper, or a counting gage, for determining the number of coupons in a pack, or for determining the number of sheets of material of any class within a single stack. It is a purpose to produce a gage or caliper having indexed means which is readable direct to ascertain the number of sheets, tickets, coupons or other material placed in the gage for calculating the number thereof.

It is a further purpose of my invention to produce a gage counter or caliper counter which has adjustable means enabling the operator to reset the counter to accommodate itself to coupons and sheets varying in thickness, in order that the instrument may be used for determining the number of sheets of material where the sheets are of one gage or thickness, and then be readjusted in order that it may be used for counting sheets of other thicknesses.

Finally, it is an object, with others, to produce a sheet caliper or counting instrument which is simple in construction and use; and which functions as a labor and time-saving device for counting coupons and sheets of paper in cigar stores, offices and paper-supply stores.

The accompanying drawings illustrate one practical working example of my paper caliper and sheet counter, and the accompanying specification describes the instrument; while the appended claims define my invention within its scope of variable changes in design and operation.

The Figure 1 illustrates the gage counter or sheet counter in side elevation; Fig. 2 shows a plan view of the instrument; Fig. 3 shows a sectional view taken along the line 3—3 of Fig. 1; and Fig. 4 is a sectional view through the dial casing.

A sheet-counting instrument embodying the principles of my invention combines any suitable form of dial counter with any appropriate form of caliper gage or thickness gage. The dial counter is mounted on the caliper or gage to indicate the measuring function of the caliper. The dial counter is adjustably carried on a caliper such that a variable adjustment may be readily effected between the counter and the caliper for the purpose of adapting the instrument to use in calculating packs of coupons or stacks of paper where the individual sheets vary in gage or thickness.

Presenting a more detailed description of my invention, it is practical to separately describe the dial counter and the other instrument with which it is combined to form a sheet counter. Any appropriate form of dial counter may be employed, and in the drawings there is shown a casing 5 having a dial 6 indexed to read, preferably, from 0 to 100. An indicator hand 7 is rotatably confined in the dial 5 to point out the numbers as determined by the operation of the instrument. A plunger 8 is slidably mounted in the casing and coöperates with the hand 7 to cause rotation thereof when the plunger is moved inwardly and outwardly in the casing. Any suitable form of connection may be employed between the hand 7 and the plunger 8 in order to transform the longitudinal movement of the plunger into rotary movement of the indicator hand.

The type of dial counter illustrated as employed in connection with the invention comprises the casing 5 having a dial 6. A vertical shaft $6^a$ is journaled axially in the casing and dial and is provided with an indicating hand 7 secured to the extremity of the shaft which extends above the dial 6. The shaft is provided with a spiral groove $7^a$ which is engaged by a pin $8^a$ in a plunger 8 mounted parallel to the shaft $6^a$ for reciprocating motion. A supporting arm 9 is rigidly secured to the casing as illustrated and a spring 10 is connected with the plunger and the casing to normally project the plunger outwardly. By this arrangement the reciprocatory motion of the plunger imparts the rotary motion to the shaft through the medium of the engagement of the plunger pin with the groove in the shaft.

The dial indicator necessarily embodies means for mounting it on any type of gage with which it is to be used. In this instance a dial support 9 is fixed to the casing 5. The dial support 9 is a suitable rod or tube acting as a rigid support for holding the dial counter, above described, in fixed position on the gage, to be set forth in the following description.

It is desirable to provide an inexpensive type of instrument or gage for completing the sheet counter, and to this end it is practical to use an ordinary pair of parallelogram-jaw pincers. In the drawings there is pointed out such a pair of pincers having movable jaws 14. The outer ends of the jaws are normally spaced apart to receive the pack or bundle of coupons or tickets to be counted. The rear ends of the parallel jaws 14 are hingedly connected to an ordinary pair of plier or pincer handles 15. The handles are pivoted one on the other through the agency of the pin 16, while the jaws 14 are pivotally connected with the handles 15 by employing a pivot screw 17.

As is well known to those conversant with this particular type of parallelogram instrument or pincers, there is provided a guide slot 18 cut in the rear end of each parallel jaw 14; and a pin 19 is fixed in each handle 15 and confined in the guide slot to constrain the jaws 14 in parallel movement by acting as guides to prevent the jaw from pivoting on the screw 17 relatively to the handle.

A tension spring 20 has one end thereof fixed to the handle 15 and the other end thereof attached to the back end of one of parallel jaws 14. The spring is normally under tension to hold the jaws in open position, as shown in Fig. 1. When the handles 15 are pressed together through the action of the operator's hand, the jaws 14 come together in parallel operation, and when the operator releases the pressure exerted on the handles the spring 20 acts to again open the instrument.

In combining the dial counter with the parallel jaw instrument there is provided a clamp 24, preferably made integral with one of the jaws 14. The clamp 24 is split to provide a pair of opposing clamp jaws which are drawn together by a threaded clamp screw 23 carried in the clamp 24. The upper portion of the clamp 24 is drilled to form a bore suitable in diameter to receive the dial support 9. The dial counter 5 is mounted on the instrument by positively clamping the dial support 9 in the clamp 24 with the plunger 8 alined with the jaws of the instrument.

An actuator plate 25 is pivoted at 26 on the jaw 14 which carries the clamp 24. The actuator plate 25 and plunger 8 are so related that movement of the actuator plate causes the plunger 8 to travel inwardly and outwardly relatively to the casing 5. A thrust pin 27 is fixed to the jaw 14 opposite the actuator plate 25 and projects through a hole made in the other jaw. The thrust pin projects through the jaw and lies against the actuator plate to impart a swinging movement to the plate when the jaws 14 are moved through the action of the handles 15.

The operation of the instrument is such that the indicator hand 7 undergoes rotation when the actuator plate 25 pivots up and down due to the thrust of the pin 27 being moved relatively to the actuator plate when the handles 15 are pressed together.

In determining the number of coupons, tickets, or any other sheet material contained within a bundle, it is only necessary to insert the bundle within the jaws 14 and depress the handles 15. This brings the jaws 14 into engagement with the coupons, whereupon the number of sheets in the bundle is indicated on the dial 6 due to the stoppage of the hand 7 at the particular index to denote the number of coupons clamped between the jaws.

The plunger 8 mounted in engagement with the actuator 25 may be adjusted relatively to the actuator by loosening the clamp screw 23 and sliding the dial support 9 rearwardly or forwardly to change the position of the plunger relatively to the actuator plate. This adjustment may be found necessary when the dial counter is assembled on the jaws. It is understood that the hand 7 should point to 0 when the handles 15 are clamped together with no sheets between the jaws 14. The adjustment of the dial counter on the instrument is made by pressing the handles 15 together, and by sliding the dial support 9 in the clamp 24 until the plunger 8 has caused the hand 7 to come opposite the 0 mark. The clamp screw 23 is then set up to positively hold the dial counter in this position. It is, furthermore, understood that the dial counter should indicate 0 when the plate 25 is down in contact with the jaw 14. When the plate 25 is slightly lifted, due to the movement of the thrust pin 27, there may be found some point of contact of the plunger 8 against the plate 25 somewhere between the low end and the high end of the plate which will cause the hand 7 to point to one division marked on the dial to indicate the fact that one sheet of paper is clamped between the jaws 14.

The instrument is especially useful in cigar stores and also in stationery and supply houses for quickly determining the approximate number of sheets of coupons or paper inserted between the jaws 14. The operator, after some experience and practice, will be able to properly manipulate the instrument and impart a uniform clamping action to the handles 15 in order to obtain approximately the same computed result throughout a number of operations.

Having thus described my invention, what I desire to secure by Letters Patent is:

1. A sheet counter comprising a pair of relatively movable jaws, one of said jaws having an opening therethrough, a thrust pin fixed on the other jaw and operable through said opening upon movement of the jaws, an actuator plate pivoted on the first mentioned jaw and adapted to co-act with the thrust pin, a dial counter mounted on the first-mentioned jaw, and means carried by the dial counter adapted to co-act with the actuator plate for registering the relative separation of said jaws.

2. A coupon and sheet counter comprising a pair of relatively movable jaws, a plate pivoted on one of said jaws, means carried by the other jaw and adapted to co-act with the plate for moving the same relatively to the first-mentioned jaw, and an indicator dial having a plunger adapted to contact with the plate, mounted on said first mentioned jaw.

3. A coupon and sheet counter comprising a pair of relatively movable jaws, a plate pivoted on one of said jaws, means carried by the other jaw and adapted to co-act with the plate for moving the same relatively to the first-mentioned jaw, a dial indicator having a plunger adapted to co-act with the plate and means for mounting said indicator on the first-mentioned jaw to permit of adjustments of the same with respect to the plate.

4. A sheet counter or counting caliper gage comprising, a pair of relatively movable jaws, means for effecting normal separation of the jaws, a thrust pin carried on one jaw movable relatively to the other jaw, an actuator plate pivoted on the other jaw and subjected to movement through the action of the thrust pin, a dial counter mounted on the second jaw, an indicator hand employed on the dial counter, and a plunger interposed between the actuator and the hand to move the hand through the agency of the actuator plate.

5. A sheet counter comprising, an instrument having a pair of jaws movable relatively one to the other, a thrust pin fixed to one jaw and movable relatively to the other jaw, a dial counter carried on the latter jaw, a plunger movable in the dial counter to cause an indication on the dial, and means interposed between the plunger and the thrust pin to move said plunger.

6. A sheet counter comprising a pair of relatively movable jaws, means for effecting normal separation of the jaws, a dial counter adjustably supported by one of the jaws, an actuator therefor supported by said jaw, and means on the other jaw adapted to co-act with the actuator for registering the relative separation of said jaws on the dial counter.

ELGIN MORELL.